(12) United States Patent
Patterson

(10) Patent No.: US 7,036,124 B1
(45) Date of Patent: Apr. 25, 2006

(54) COMPUTER RESOURCE MANAGEMENT FOR COMPETING PROCESSES

(75) Inventor: David John Martin Patterson, Grenoble (FR)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/259,589

(22) Filed: Mar. 1, 1999

(30) Foreign Application Priority Data

Jun. 10, 1998 (EP) .................................. 98401393

(51) Int. Cl.
*G06F 9/46* (2006.01)

(52) U.S. Cl. ....................................... 718/104; 718/100

(58) Field of Classification Search ................. 709/313, 709/314, 100–108, 200–253; 707/202; 705/7–11; 718/100–108
See application file for complete search history.

(56) References Cited

U.S. PATENT DOCUMENTS

| | | | |
|---|---|---|---|
| 3,579,207 A | 5/1971 | Barlett et al. | |
| 4,420,909 A | 12/1983 | Steere, Jr. | |
| 4,665,484 A | 5/1987 | Nanba | |
| 5,060,150 A * | 10/1991 | Simor ......................... | 709/313 |
| 5,115,499 A | 5/1992 | Stiffler et al. | |
| 5,193,110 A * | 3/1993 | Jones et al. .................. | 370/259 |
| 5,233,533 A * | 8/1993 | Edstrom et al. ............. | 700/103 |
| 5,408,663 A | 4/1995 | Miller | |
| 5,420,909 A | 5/1995 | Ng et al. | |
| 5,423,066 A | 6/1995 | Sasuta | |
| 5,649,113 A | 7/1997 | Zhu et al. | |
| 5,652,789 A | 7/1997 | Miner | |
| 5,666,532 A * | 9/1997 | Saks et al. ................... | 707/205 |
| 5,706,516 A * | 1/1998 | Chang et al. ................ | 709/314 |
| 5,715,457 A | 2/1998 | Wakatani | |
| 5,926,635 A | 7/1999 | Hsueh et al. | |
| 5,978,832 A | 11/1999 | Sirkin | |
| 6,026,158 A | 2/2000 | Bayless et al. | |
| 6,035,277 A | 3/2000 | Anbil et al. | |
| 6,052,695 A * | 4/2000 | Abe et al. .................... | 707/202 |
| 6,070,142 A * | 5/2000 | McDonough et al. .......... | 705/7 |
| 6,085,198 A | 7/2000 | Skinner et al. | |
| H1894 H | 10/2000 | Fletcher et al. | |
| H1896 H * | 10/2000 | Hoffpauir et al. ............ | 455/433 |
| H1918 H * | 11/2000 | Hoffpauir et al. ............ | 379/242 |

(Continued)

FOREIGN PATENT DOCUMENTS

EP  0 537 509 A2  4/1993

(Continued)

*Primary Examiner*—Meng-Ai An
*Assistant Examiner*—Kenneth Tang
(74) *Attorney, Agent, or Firm*—Finnegan, Henderson, Farabow, Garrett & Dunner, L.L.P.

(57) ABSTRACT

Resource management for controlling allocation of a resource to competing computer processes is achieved through the use of a joining function. A resource manager is responsive to identification of a thread for a first process requesting allocation of the resource, when the resource is already allocated to a thread for a second process, to establish a joining function to the thread for the second process. The joining function is operable to notify the resource manager on termination of the thread for the second process. The resource manager can therefore be operable in response to termination of the thread for the second process to allocate the resource to the first process. The first and second processes can be call handling processes for telecommunications apparatus where the resource manager provides allocation of a telephony resource, such as a modem or network interface, to the competing call handling applications. A telephony interface and the applications can be implemented in the Java™ language.

21 Claims, 10 Drawing Sheets

U.S. PATENT DOCUMENTS

| | | |
|---|---|---|
| 6,195,676 B1 | 2/2001 | Spix et al. |
| H1964 H | 6/2001 | Hoffpauir et al. |
| 6,272,531 B1 | 8/2001 | Shrader |
| 6,275,843 B1 * | 8/2001 | Chorn ................ 709/101 |
| 6,314,446 B1 | 11/2001 | Stiles |
| 6,381,321 B1 | 4/2002 | Brown et al. |
| 6,385,638 B1 * | 5/2002 | Baker-Harvey ............ 707/107 |
| 6,411,983 B1 | 6/2002 | Gallop |
| 6,504,913 B1 | 1/2003 | Patterson |
| 6,570,972 B1 | 5/2003 | Patterson |

FOREIGN PATENT DOCUMENTS

| | | |
|---|---|---|
| EP | 0 657 809 | 6/1995 |
| EP | 0 817 041 | 1/1998 |
| EP | 0 817 041 A2 | 1/1998 |
| EP | 964332 A1 * | 12/1999 |

* cited by examiner

COMPUTER RESOURCE MANAGEMENT FOR COMPETING PROCESSES

BACKGROUND OF THE INVENTION

This invention relates to resource management in a computing environment where a resource manager is required to control allocation of a resource to competing computing processes.

The invention finds particular, but not exclusive application, to telecommunications apparatus where a plurality of competing processes require access to a telephony resource, such as a modem device.

Classical solutions to resource management in such an environment involve a resource manager model where a single entity provides an "acquire resource" and "release resource" primitives, whereby would-be users of this resource ask the entity for access to the resource. Access may be granted or refused as appropriate.

If access to the resource is granted, the requesting process becomes the owner of the resource until such time as it chooses to relinquish it by performing a "release resource" operation. During its period of ownership, the owner of the resource has exclusive use of it, whereby the aim of the resource management scheme is achieved. Many specific examples of this type of arrangement are known.

However, this type of arrangement, although widely used, has a major weakness. If the current resource owner (frequently a separate unit of execution such as a thread) fails, and exits, due to software or another error, then the resource may end up in a permanently unavailable state because the current owner has failed to perform a "release resource" operation before terminating.

Conventional software design either ignores this problem or tries to avoid it by having the resource requester attempt to clean up (release the resource) before exiting. This, however, cannot always be achieved in a reliable manner. Indeed, with such an arrangement, the resource manager must rely on all of the resource requesters behaving in a reliable and deterministic manner in order to provide overall reliable system operation.

This reliance on the individual requesting processes is a significant weakness in many systems, particularly where those processes may be provided by third party vendors, and the quality of the processes may not always be guaranteed.

Accordingly, an aim of the present invention is to provide more reliable resource management.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with one aspect of the invention, there is provided a resource manager operable to control allocation of a resource to competing computing processes, the resource manager being responsive to identification of a thread for a first process requesting allocation of the resource, when the resource is already allocated to a thread for a second process, to establish a joining function to the thread for the second process. The joining function is operable to notify the resource manager on termination of the thread for the second process. The resource manager can thereby be operable in response to termination of the thread for the second process to allocate the resource to the first process.

An embodiment of the invention is able to provide reliable resource management through the use of a joining function which enables the resource manager simply to join to the thread which is the current resource owner. Such a joining function is a standard language component of, for example, the Java™ language. Accordingly, a resource manager in accordance with an embodiment of the invention, can be provided with a single method "acquireDevice( )" which may be called by any process, or application, wishing to use a resource (e.g., a telephony device such as a modem). Standard language primitives ensure that only one application may execute this method at one time, thereby guaranteeing exclusive access. The would-be owning application can identify its operating thread to the resource manager. By affecting the join on the thread which is the current resource owner, the resource manager is able simply to wait until the owning application thread terminates, at which time the join language function notifies the resource manager that the previously owning application has terminated. This notification is provided by the language constructs irrespective of the manner in which the previous owning application terminated. The resource manager is then able to allocate the resource toe the requesting application.

In one embodiment of the invention, resource manager comprises object-oriented computer software operable in an object oriented environment and the processes are software applications operable in the object oriented environment.

In one embodiment, the software applications comprise one or more bean objects registrable with the resource manager and the resource manager comprises one or more objects of the Java language. The resource manager provides an acquireDevice( ) method which can be called by an application requesting control of the resource. Through the use of the join function of the Java language, a language event passively releases a resource on termination of a thread identified by the join function.

In an embodiment the resource manager controls access by a plurality of telecommunications applications to a telephony device in a telecommunications apparatus. The resource manager can also provide a dispatch mechanism for controlling dispatching of a call received by the telephony device to the telecommunications applications.

The resource manager can be provided as a computer software product on a carrier medium, such as a data storage or a data transmission medium. Alternatively, or in addition, at least part of the management mechanism may be embedded, or hardwired, in a device such as an ASIC.

In accordance with another aspect of the invention, there is provided a telecommunications apparatus including at least one telephony resource for connection to a telecommunications network and a resource manager as defined above. The telephony resource can be an interface to the telecommunications network, such as a modem, whereby the resource manager controls access via the telephony resource to an external telecommunications network by, for example, call processing applications.

The call processing applications, may, for example, be selected from a call answering application, a voicemail application, a facsimile application and a data application.

In accordance with a further aspect of the invention, there is provided a computer-implemented method of managing allocation of a resource to competing processes, the method including:

responding to identification of a thread for a first process requesting allocation of the resource when the resource is already allocated to a thread for a second process, to establish a joining function to the thread for the second process;

responding to the joining function notifying termination of the thread for the second process to allocate the resource to the first process.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
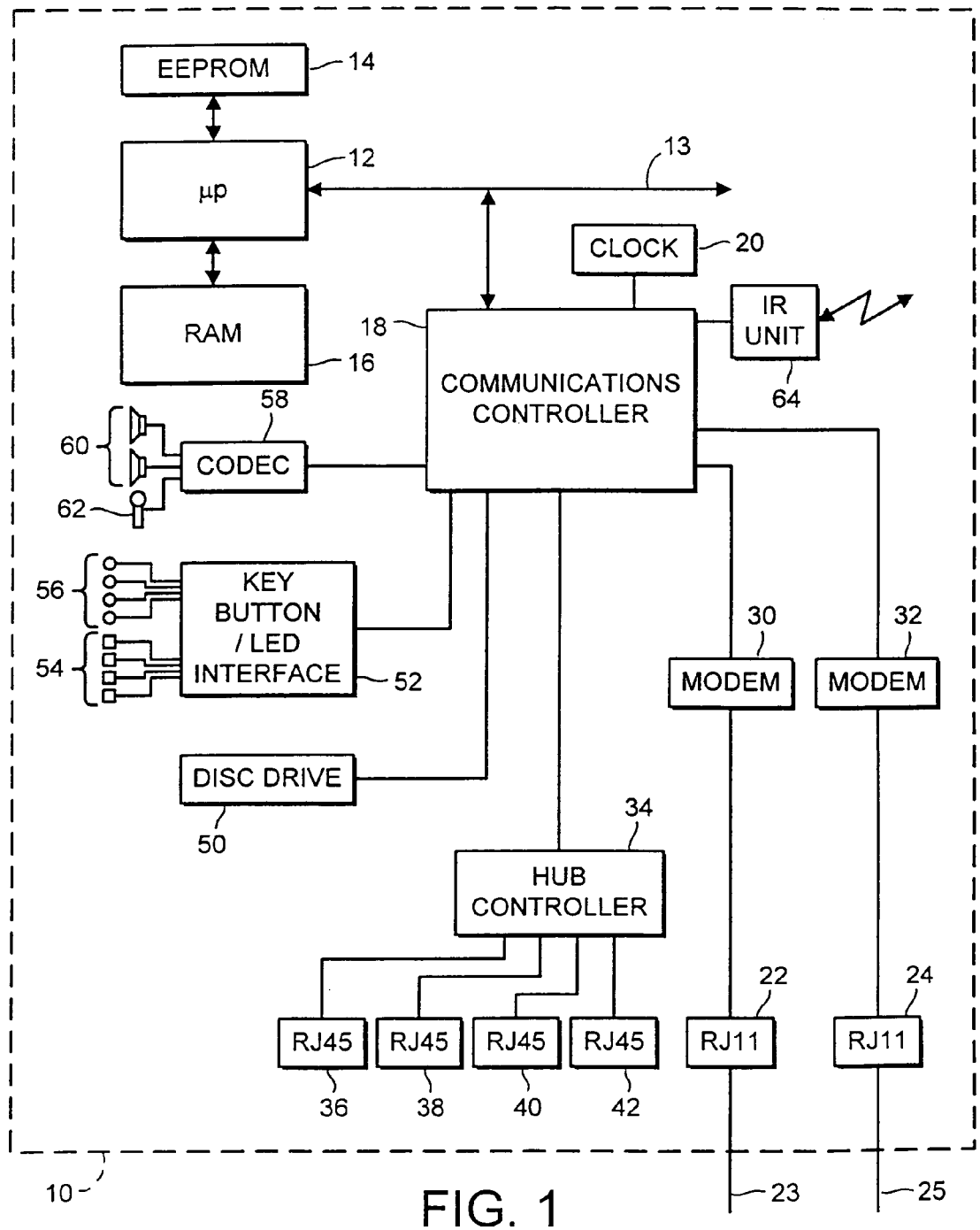
FIG. 1 is a schematic overview of telecommunications apparatus for an embodiment of the present invention.

FIG. 1 is a schematic overview of telecommunications apparatus for implementing an embodiment consistent with the present invention.

As shown in FIG. 1, a telecommunications device 10 comprises a microprocessor 12 with associated read only memory 14, (which may be implemented as electrically erasable programmable read only memory (EEPROM)), and random access memory (RAM) 16. The microprocessor is connected to a communications controller 18 (in the present example implemented as an ASIC) via a PCI bus 13. In other embodiments other bus protocols could be used. A clock generator 20 provides clock signals for controlling the operation of the device 10. RJ11 ports 22 and 24 are provided for connection to telephone lines 23 and 25 at a user's premises. It will be appreciated that RJ11 connectors may be replaced by alternative connectors as used by a local telecommunications system.

Modems 30 and 32 are connected to the RJ11 connectors 22 and 24 for connecting the communications controller 18 to the telephone lines 23 and 25 at the user's premises. Although modem devices 30 and 32 are provided and the example of the device shown in FIG. 1 is intended for use with analogue telephone lines, it will be appreciated that alternative interfaces can be provided for direct connection to digital telephone lines (for example ISDN). Similarly, suitable connections for cable, wireless, satellite and other telecommunication services can be provided.

Also connected to the communications controller 18 is a hub controller 34 which itself is connected to RJ45 connectors 36, 38, 40 and 42 for the connection of personal computers, or workstations or other computing devices to the telecommunications device 10. In the present instance four RJ45 connectors are provided, although other numbers of RJ45 connectors could be provided in other examples of the device 10 as shown in FIG. 1. As well as parallel RJ45 type connectors for connections to computer equipment, other digital interfaces (not shown) could be provided in the form of, by way of examples, a serial port, a USB port, a firewire connector, etc. Persistent storage in the form of a disc drive 50 is connected to the communications controller which, in the present instance, also provides the functions of a disc controller. Alternatively, a separate disc controller could be provided externally to the communications controller 18. Other forms of persistent storage, for example solid state storage, could be provided in addition to or instead of the disc drive 50. A key button/LED interface 52 allows the connection of LED indicators 56 and key buttons 54 for the display of information and for the input of information. Other forms of input and/or output devices, such as a keyboard, a display, a pointing device, etc., could be provided in addition to or instead of the LED indicators and key buttons.

A coder-decoder (CODEC 58) is provided for the connection of loudspeakers 60 and a microphone 62 for the output and input of audio information. An infra-red unit 64 can be provided to enable infra-red control of the device 10 and/or for infra-red porting of information between the device 10 and another device, such as for example a computer.

Figure 2:
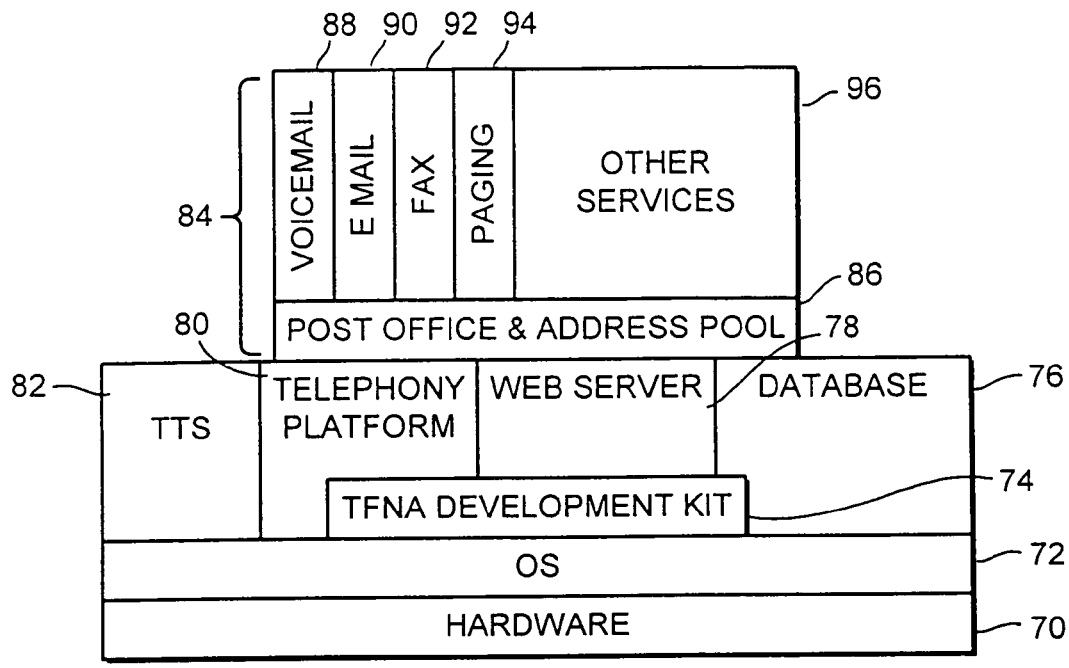
FIG. 2 is a schematic overview of a software/hardware interface in the apparatus of FIG. 1.

FIG. 2 is a schematic overview of the software/hardware interface in the device 10. As shown in FIG. 2, an operating system 72 resides on the hardware 70 of the telecommunications device 10. All services and applications in the particular embodiment of the device are based on the Java™ Development Kit 74. A web server 78 provides complete internet web and proxy server functions with support for pluggable servlets. The web server 78 and the servlets may be compatible with the Java programming environment. It includes a built-in configurable cache and enables web page updates to be batch loaded and preloaded. An object-oriented database 76 is provided for persistent data storage, the database 76 being held on the disc drive 50 in the present example of the device 10.

A text to speech system (TTS) 82 converts text into audible speech, which can be played back on the speakers 60 or on a telephone connected to the telecommunications device 10. A telephony platform 80 completes the main software platform on which applications reside.

A post office and address pool service 86 provides unified messaging through the integration of voicemail, e-mail, facsimile and paging services. Messages can be accessed by phone and personal computer locally, or remotely. Users can also access messages via any Point of Presence (POP) e-mail client or HyperText Markup Language (HTML) web browser.

A voicemail application 88 provides voicemail and answering machine services. It functions as an answering machine configurable for voicemail. The buttons 54 can be used to provide play and delete functions, and the answering machine functions are also accessible through the telephone and voicemail. Various telephony functions such as smart ring detection, caller identity (ID) and automatic announcements based on preselected parameters, such as caller ID, ring type, time of day, date and so on, can be provided.

An e-mail application 90 provides e-mail functionality which is accessible locally and remotely. A fax application 92 provides fax services, and a paging application 94 provides paging services. Other services 96 may be provided by other applications such as, for example, an address book function.

Accordingly, the telecommunications device 10 provides a unified interface for incoming and outgoing communication. It allows users to compose e-mail messages, as well as to forward and receive faxes and voicemails as e-mails. Access to all of the functionality of the device can be achieved by means of a web browser via, for example, a HTML, or Java front end.

Figure 3:
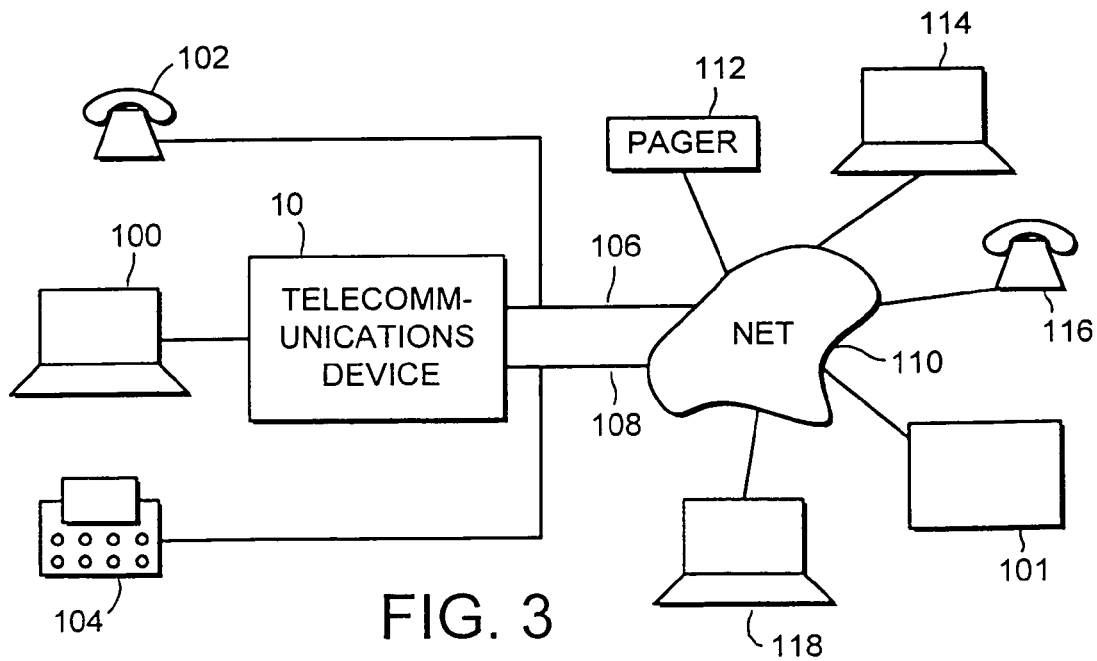
FIG. 3 is a schematic representation of the apparatus of FIG. 1 connected to a telecommunications network.

FIG. 3 is a schematic overview representing the use of the telecommunications device 10 at a subscriber location with, connected thereto, a personal computer or workstation 100. First and second telephone lines 106 and 108 connect the telecommunications device to a public switched telephone network (PSTN) 110. The connection to the PSTN can be by analogue or digital connection, either directly or indirectly, via a cable, wireless, satellite or any other manner. Optionally, a telephone 102 and a facsimile (fax) machine 104 may also be connected to the lines 106 and 108. Through the telecommunications device, communications may be made to another such telecommunications device 101, a remote pager 112, a remote personal computer or workstation 114, a remote telephone 116, a remote server station 118, and so on.

Figure 4:
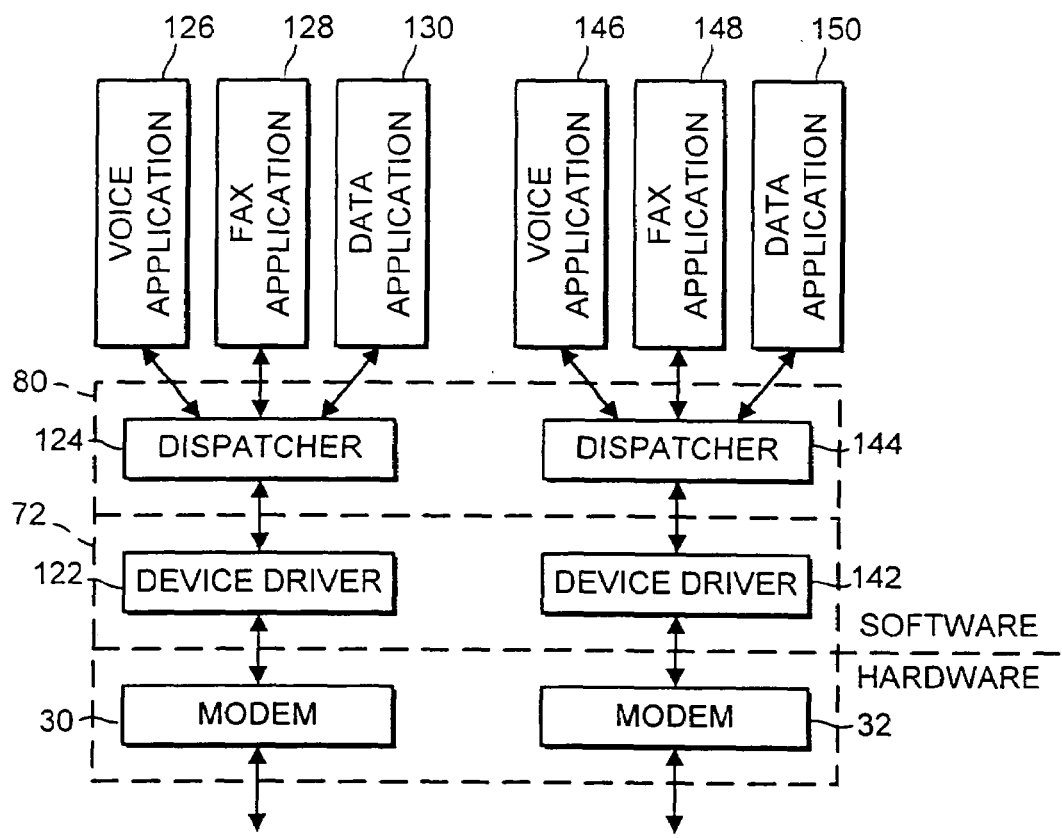
FIG. 4 is a schematic representation of the relationship between various elements of an example of the apparatus of FIG. 1.

FIG. 4 is a schematic representation of the relationship between various applications, and elements of the telephony platform 80, the operating system 72 and the modems 30, 32 shown in FIGS. 1 and 2.

The arrangement shown in FIG. 4 enables allocation of the modem devices 30 and 32 to the individual applications.

Each of the modems 30 and 32 is functionally connected to corresponding device drivers 122 and 142 respectively, which form part of the operating system 72. Also, respective dispatchers 124 and 144 are provided in the telephony platform 80 for managing the allocation of the first, and second, modems, respectively, to the various applications 126, 128, 130 and 146, 148, 150, respectively.

As shown in FIG. 4, first instances of a voice application 126, a fax application 128 and a data application 130 are associated with the dispatcher 124. The instances 126, 128 and 130 of the applications form functional modules for performing appropriate functions. Second instances of a voice application 146, a fax application 148 and a data application 150 are associated with the dispatcher 144. The first and second instances 126 and 146 of a voice application may relate to the same voice application, or to different voice applications. Similarly, the first and second instances 128 and 146 of a fax application may relate to the same fax application or to different fax applications. The same applies to the first and second instances 130, 150 of a data application. Also, it should be noted that there may be 0, 1, or more of each type of application associated with the respective dispatcher. Accordingly, there may, for example, be two or more data applications associated with either of the dispatchers 124 and 144. Also, there may be other forms of applications associated with the dispatchers 124 and 144, such as, for example, a billing application. The dispatchers 122 and 142 each act as resource managers controlling the allocation of the modems 30 and 32, respectively; which each form system resources, to the competing application.

In one embodiment consistent with the present invention, the applications are implemented as beans, more particularly JavaBeans™ components. A bean is a reusable software component which can be manipulated visually in a builder tool (e.g. an editor or graphical user interface builder (GUI builder)). Beans vary in functionality, but they typically share certain common defining features including a set of properties, a set of methods for performing actions, and support for events and for introspection. The properties allow beans to be manipulated programmatically and support customisation of the bean. The methods implement the properties. The support for events enables beans to fire events and define the events which can be fired. The support for introspection enables the properties, events and methods of the bean to be inspected from externally.

Each application such as those shown in FIG. 4 which requires to use a telephony device such as the modems 30, 32 has to register itself with the dispatcher entities 124, 144 responsible for those telephony devices. There is one dispatcher per device as shown in FIG. 4.

Figure 5:
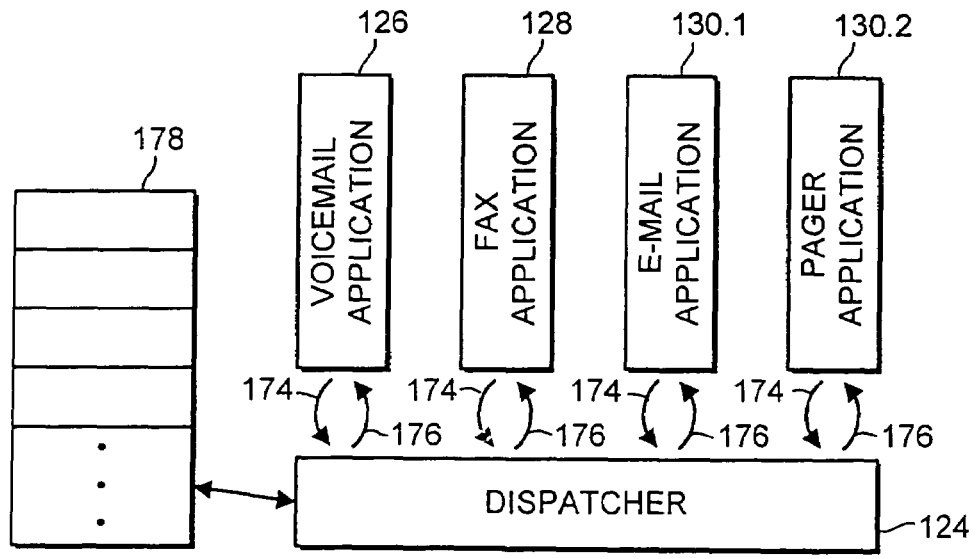
FIG. 5 is a schematic representation of a registration process for applications.

FIG. 5 represents the registration process for registering applications such as a voice application 126, a fax application 128 and first and second data applications 130.1 and 130.2 with the dispatcher 124. At an installation time, each application wishing to use a telephony device has to register itself as a beans listener (in the particular embodiment a JavaBeans-style listener) with the device dispatcher. The application concerned makes a request 174 to the dispatcher 124 for registration. The device dispatcher 124 is able to query each application to establish a defined set of characteristics. These characteristics include a priority which is pre-allocated to the application. By virtue of the priority, the dispatcher 124 is able to determine whether the application is classed as a voice, a fax, or a data application. As will be described in more detail below, the priority information is then used by the device dispatcher 124 to prioritise the calling of applications to be notified of a new incoming call. It can also define a typical duration for which the application will require access to the modem 30 to carry out a telephony function.

The dispatcher 124 then maintains a set of links 176 to the individual applications registered with the dispatcher, the links being maintained in a register in storage 178. The information relating to an application which can be stored in the storage 178 includes the name of the application, the link to the application, the type of the application, a priority allocated to the application, and a typical time required by the application to carry out a telephony function using the modem 30 (or 32).

Figure 6:
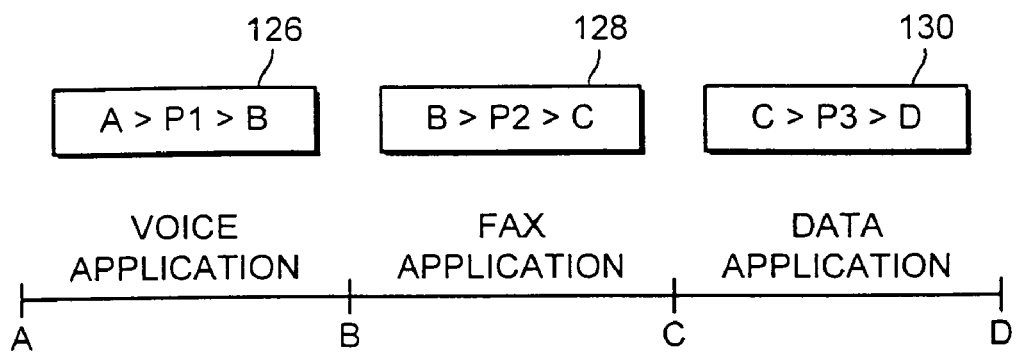
FIG. 6 illustrates various priorities for applications.

FIG. 6 illustrates the various priorities allocated to, respectively, voice, facsimile (fax) and data applications. Specifically, a voice application (e.g. 126) will be given a priority P1 between A and B, a fax application (e.g. 128) will be given a priority P2 between B and C and a data application (e.g. 130) will be given a priority between C and D, where A>B>C>D. Each application will be allocated its own priority so that, where there are multiple applications within a given priority range, the individual applications can be given separate priorities. In a preferred embodiment of the invention, D is the largest number available within a priority range, A is zero, and B and C are integers equally spaced between the largest number available and zero. The priorities are used to determine the order in which the various applications are invoked in the event of an incoming call.

Figure 7:
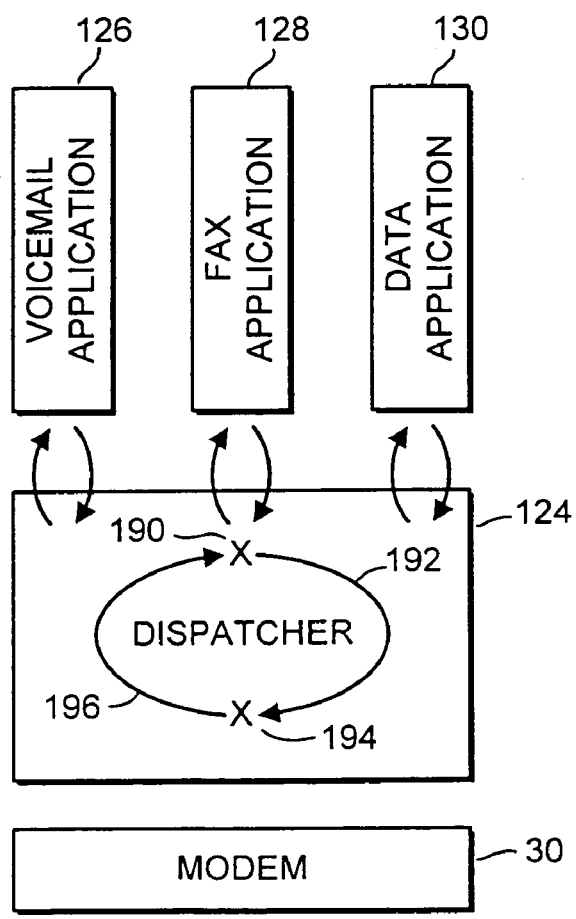
FIG. 7 is a schematic overview of the passing of control between a dispatcher and various applications.

FIG. 7 is a schematic overview of the passing of control between the dispatcher 124 and various applications, such as applications 126, 128 and 130. The dispatcher cycles between two basic states 190 and 194. In state 190 the dispatcher has allocated the modem device 30 to one of the applications. In state 194 the dispatcher is waiting for an incoming call to be received from the modem device 30, or alternatively for a request from one of the applications 126, 128 and 130 to use the modem 30.

Figure 8:
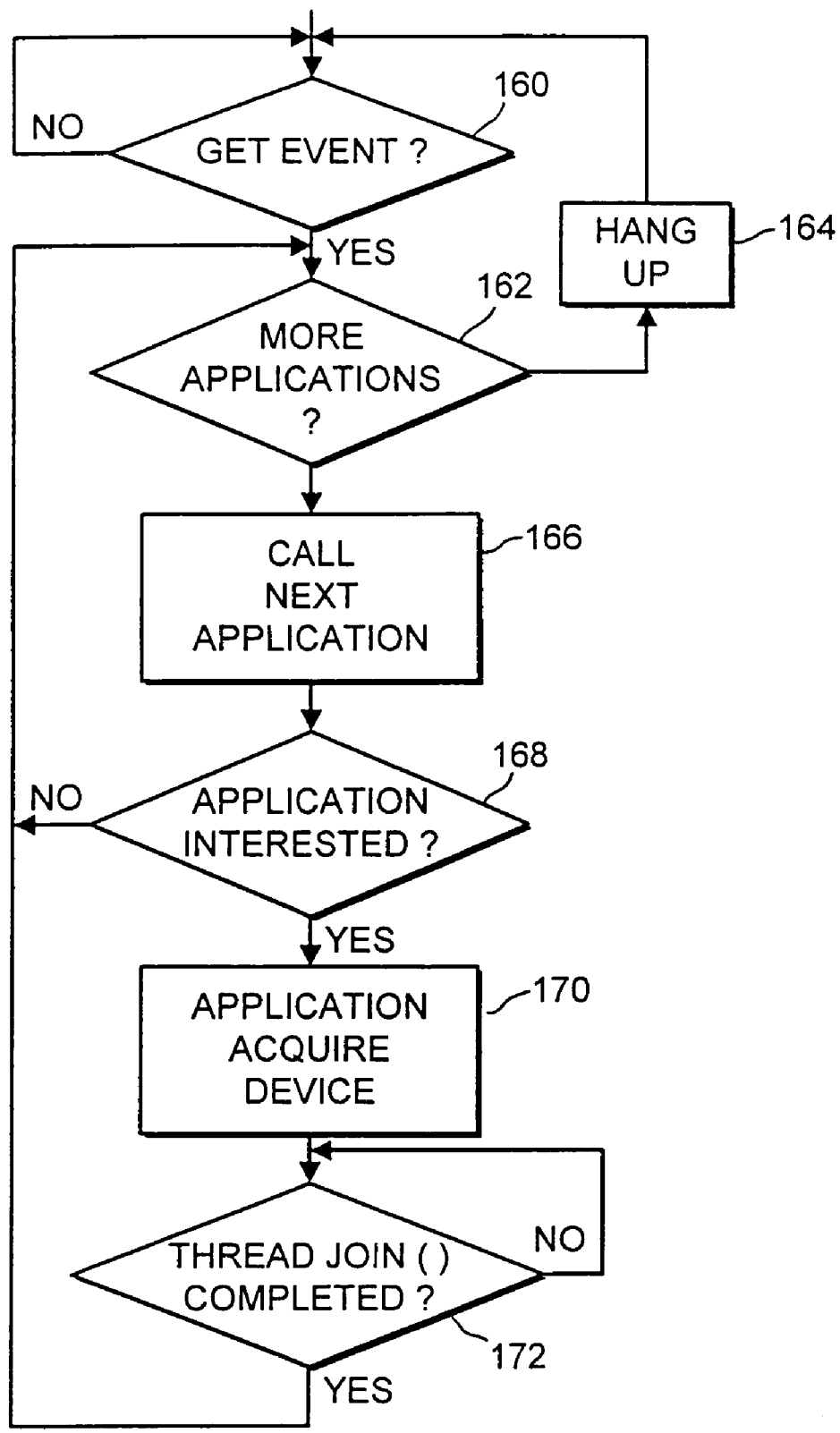
FIG. 8 is a flow diagram illustrating call processing by the dispatcher.

FIG. 8 illustrates a sequence of events which will occur when a call is received at the modem 30.

Step 160 in FIG. 8 represents state 194 in FIG. 7 at which the dispatcher idles awaiting a call event from the modem device 30 or a request for use of the modem from one of the applications 126, 128 and 130. When a call event from the modem device 30 is detected, the dispatcher 124 refers to the stored characteristics of the applications, including the allocated priority, to determine the application having the highest priority. It then calls that application at step 166 to enquire from the application whether it is interested in taking up the call concerned.

Figure 9:
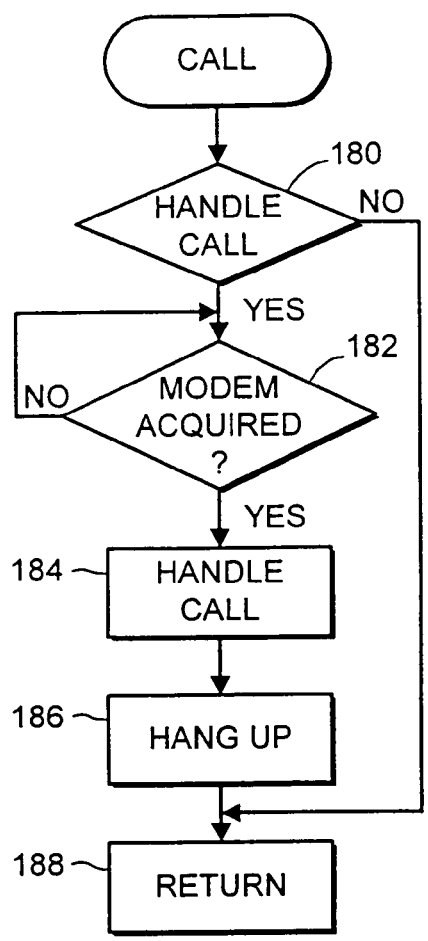
FIG. 9 illustrates call processing by an application.

FIG. 9 illustrates the basic steps involved in each application determining whether or not it is interested in handling the call. Accordingly, with reference to FIG. 9, on being notified of an incoming call, an application establishes at step 180 whether it is able to handle the call. The test performed at step 180 will depend on the type of application concerned. It can use the characteristics of the device which has been allocated to it to determine whether it can take up the call. For example, if the device concerned which has been allocated is not capable of voice-mode operation, then a voice mail application would most likely decline to handle the call. However, in the case of connection to the modem, the voicemail application would in principle be able to handle the call.

Accordingly, if the application determines that it can attempt to handle a call, it answers the call (if not already answered) and then must rapidly determine if the call is for it or not. For example, if a voice application detects a fax calling tone, then it has determined that the call is not for it. If an application decides that the call is not for it, then it must exit as rapidly as possible and return control (188) to the dispatcher so that the dispatcher can pass the call to another application for handling without hanging up. If, however, the application does decide to handle the call, it then requests that the modem be allocated to it at step 182. If the modem is acquired, then the application processes the call at step 184. On completion, the application hangs up at step 186 and returns control at step 188 to the dispatcher 124. The applications 126, 128, 130, thus form functional modules for handling different types of call.

Returning to FIG. 8, step 168 corresponds to step 180 of FIG. 9. Accordingly, if an application is not interested in handling a call, control passes back to the dispatcher to step 162 and the next application in the list of priorities is chosen. If, however, the application does wish to handle the call, then the application makes a request to acquire the device (step 182 of FIG. 9), and, in this case it being assumed that no other application has control of the device, the request will be granted. The dispatcher then waits at step 190 (see FIG. 7) for the application to terminate. In order to ensure that termination of the application is captured, an embodiment of the invention links the dispatcher to termination of the application by means of a Thread.join( ) operation. The use of the Thread.join( ) operation will be described in more detail below.

Figure 10:
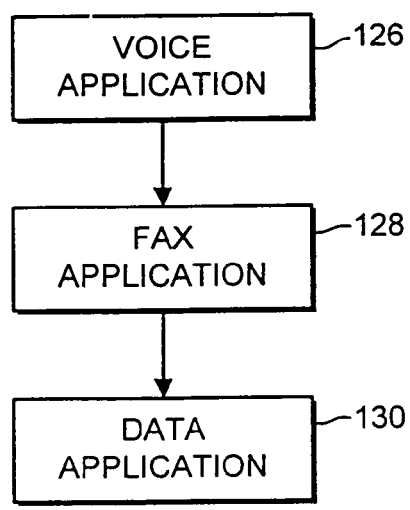
FIG. 10 illustrates an order of processing of a call by various applications.

Through the use of the various priorities for the individual applications, the dispatcher is able to guarantee that, as represented in FIG. 10, a voice application 126 will be offered the chance to handle calls before a fax application 128, which in turn will have a chance to handle calls before a data application 130. This enables an analog telephony call discrimination mechanism to work effectively. In particular, in the case of analog telephony, using modems, it is impossible to determine the type of an incoming call without first answering the call and finding out what form the call is. It is, moreover, desirable that a voice application is operable first as it would be disconcerting to a voice caller to be presented by data tones instead of a voice service.

Accordingly, through the use of the priority method employed in an embodiment of the present invention, a voice application first of all determines whether the incoming call is a fax or a data call, this being determined by either the receipt of appropriate tones supplied by the caller or by silence. The former is indicative of a fax call, and the latter of a data call. If no tones are received but the call is not silent, then it is assumed to be a voice call.

Where fax tones or silence is received, then the dispatcher gives a fax application an opportunity to answer the call. A fax application is able to discriminate between a fax and a data call, because a fax call will normally only generate the fax call tone, whereas as a data call will be silent awaiting data tones from the receiver. Accordingly, if a fax application determines that the incoming call is a fax call, it then proceeds to handle that call.

If the incoming call is not a fax call, then control passes back to the dispatcher, which then allocates the call to a data application for handling the call.

As mentioned above, there may be more than one voice application, more than one fax application and more than one data application. In this case, the dispatcher allocates a call in accordance with the individual priorities of the applications concerned. The order is determined by controlling the priorities which are allocated to individual applications so that the applications are then called in the appropriate sequence.

In the above, with reference to FIGS. 8, 9 and 10, a description has been given of the processing of a call received via the modem device 30. It will be appreciated that the process would be the same if received via the modem 32, with the exception that the dispatcher 144 would be responsible for dispatching the tasks to the corresponding instances of voice, fax and data applications 146, 148, 150.

Figure 11:
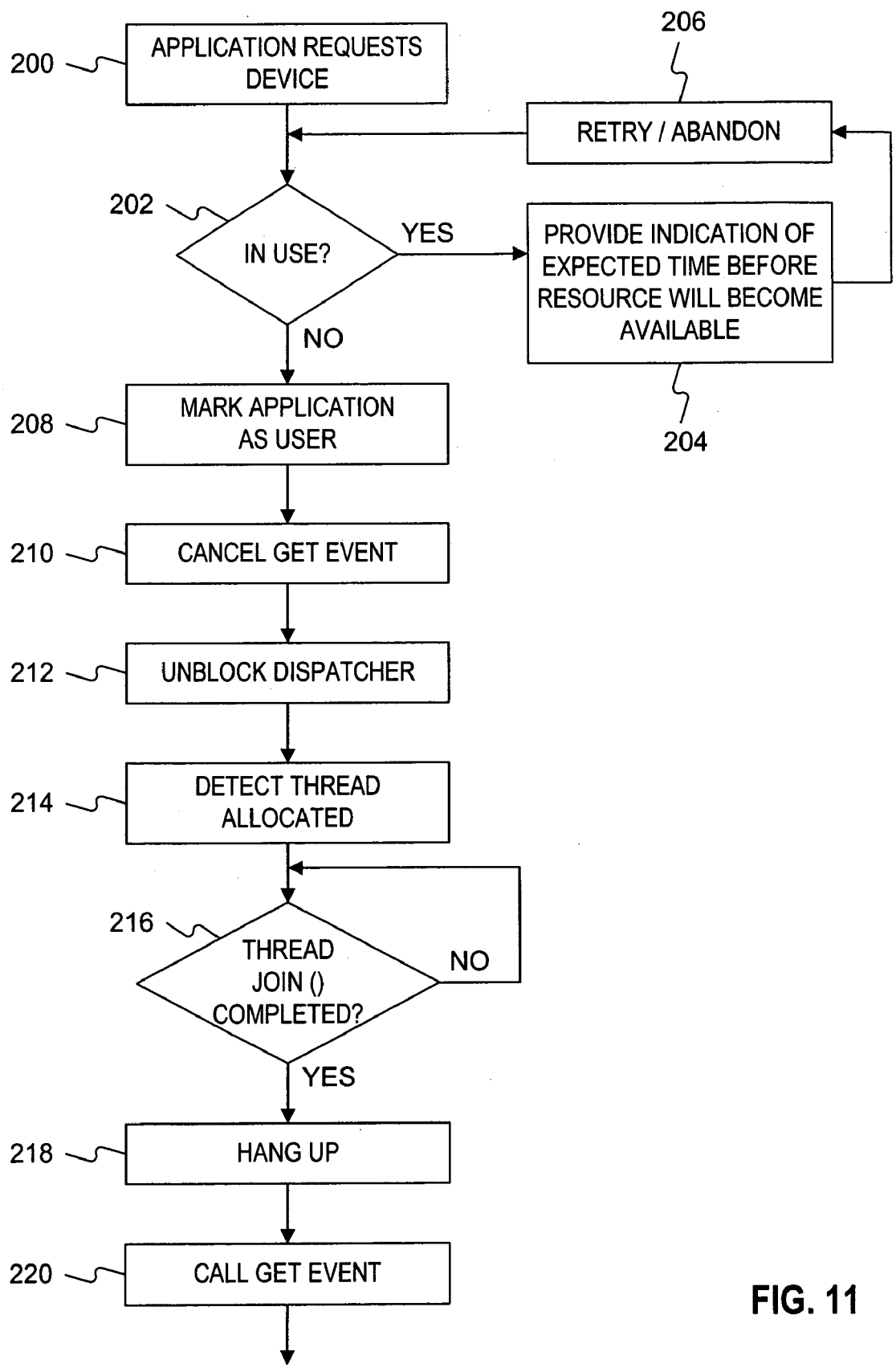
FIG. 11 is a flow diagram representing the processing of a request from an application for use of a resource.

FIG. 11 is a description of the processing of a request from an application such as one of the voice, fax and data applications 126, 128 and 130 to the dispatcher 124 to use the modem device 30. It will be appreciated that a similar process is also involved where one of the applications 146, 148 and 150 makes a request to the dispatcher 144 for use of the modem device 32.

Accordingly, with reference to FIG. 11, an application requests the use of the device at step 200. At step 202, the dispatcher checks whether the device is in use or not. If the device is already in use, (i.e. the dispatcher is at state 190 illustrated in FIG. 7) then the dispatcher 124 reports this back to the requesting application. Optionally a hint indication may be provided at step 204 as to the time the device will remain in use, thereby enabling the application to decide at step 206 whether to re-try the request at a predetermined time in the future, or to abandon the request.

In an embodiment to the invention, the application requests the use of the device by the dispatcher by calling an acquireDevice( ) primitive. The acquireDevice( ) primitive indicates success or failure to the caller depending on whether the device is currently free or not. In order to be able to return the hint, the acquireDevice( ) primitive is arranged to return extra information about how long it believes the device will be occupied for, so that the calling application can use this hint to implement an effective retry policy.

There are a number of possible ways in which the dispatcher can determine how long the device will be occupied.

In a simple form, this can be provided by heuristics based on an application type. The dispatcher knows the basic type of each telephony application by virtue of the priority number which is registered in the register storage 178 identified in FIG. 5. Accordingly, on the basis of the type of application currently owning the device, the dispatcher is able to guess typical values of a call duration. For example, a typical duration of a voice application (e.g. voicemail) is less than two minutes. A typical duration of a fax application (transmission/reception) is of the order of one to five minutes. A typical duration of a data application under a Point-to-Point Protocol (PPP) is greater than ten minutes. It should be noted that these values are only given as examples, and in any particular implementation, other values may be chosen. However, the dispatcher is arranged to record the start time of an application and the type of application so that when the acquireDevice primitive is called, the dispatcher can deduce an estimated remaining time as the difference between the expected duration and the time elapsed since the start time and can provide an indication of this with the acquireDevice response to the calling application. The calling application can then use this in step 206 to decide when to try again to obtain the device.

Figure 12:
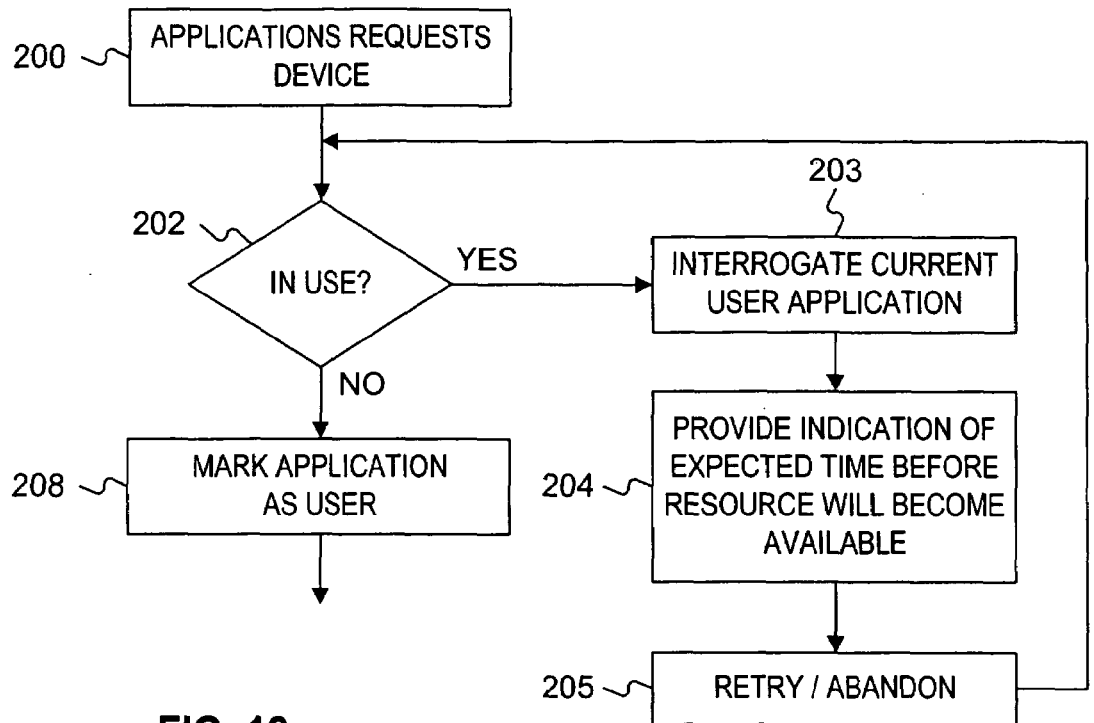
FIG. 12 illustrates an alternative to part of the flow diagram of FIG. 11.

Alternatively, as represented in FIG. 12, the dispatcher may provide an additional step 203 of interrogating the current user application. This interrogation could be by means of a re-entrant call, or could alternatively be by means of inspecting attributes of the current user application is provided with suitable methods for giving an indication of any further time it expects to continue to require the use of the device allocated to it. It would, for example, often be the case that a fax application would be able to give a relatively detailed estimate of the remaining time required in order to finish the current job. This could be deduced from a transfer rate and a volume of fax data still to be transmitted, for example.

It would also be possible for a combination of the heuristic and query approaches described above. Accordingly, where a query is made to an application, and the application is unable or does not provide any indication of the possible remaining time it requires use of the device, then the hint could be based on the heuristic approach described above.

As a result of providing hint information, it is possible for an application either to choose to re-try at a later time, determined on the basis of the hint provided, or even to abandon an attempt to re-try a request for use of the device.

Returning to FIG. 11, if the device is currently not in use, then the dispatcher will be idling in state 194 shown in FIG. 7. Accordingly, in step 208, the dispatcher marks the requesting application as the current user, and makes a "cancelGetEvent( )" call in step 210 in order to unblock the dispatcher in step 212. Control then passes (as represented by loop 196 in FIG. 7) to state 190 in FIG. 7. In step 214, the dispatcher detects the thread allocated to the user application and then waits for that thread to terminate, by means of a join operation, for example a java.lang.Thread.join( ) operation in a Java language environment. The dispatcher idles in step 216 until Thread.join( ) completes at which point the dispatcher hangs up the call made by the application (if this has not already been done by the application itself). A device.GetEvent( ) call is made in step 220, whereby the dispatcher returns via edge 192 to the state 194 represented in FIG. 7.

As mentioned above, with reference to FIGS. 8 and 11, a preferred embodiment of the invention uses a Thread.join( ) method in order to detect the termination of a thread. The Thread.join( ) method is a standard feature of the Java programming environment. Other equivalent join functions may be provided in other operating environments. This provides an effective and fully reliable solution to the determination of when a thread terminates, and consequently an effective solution to the management of a shared resource.

Classical solutions to resource management where a single entity provides "acquire resource" and "release resource" primitives, involve would be users of the resource asking the entity for access to the resource. In the situation where access to the resource is granted, the request becomes the owner of the resource until such time as it chooses to relinquish it by performing a "release resource" operation. During the period of ownership, the owner of the resource has exclusive use of it. This scheme, although widely used, has a major disadvantage in that, if a current resource owner fails and exists due to a software or other error, then the resource may end up in a permanently unavailable state because the current owner failed to perform a "release resource" operation before finishing. The use of the join method avoids this problem in that the resource management is provided by the Java language itself. Although specific reference is made to a Java language, it will be appreciate that this technique is not limited to the Java language, and can be provided in other language environments.

Figure 13:
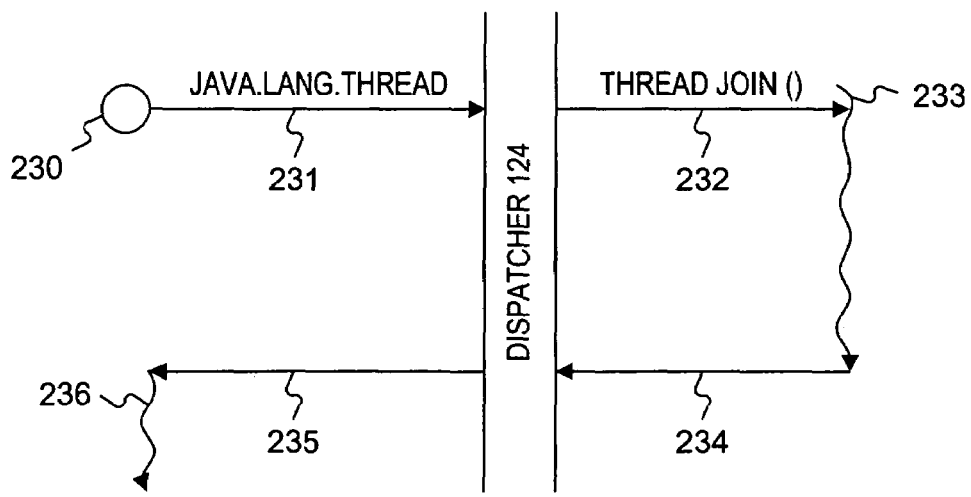
FIG. 13 illustrates the acquisition and release of a resource by an application.

In essence, this resource management technique can be summarised as follows, with reference to FIG. 13. The resource manager (in the present case the dispatcher 124) provides the method "acquireDevice" which may be called by any application wishing to use the resource in question (in the present case the telephony device (i.e. the modem 30). Fundamental synchronisation primitives are then used to make sure that only one caller can execute this method at a time, thereby guaranteeing exclusive access. The would be owner calls the acquireDevice( ) primitive and identifies itself 231 to the resource manager (here the dispatcher 124). In a Java programming environment it can identify itself as an instance of Java.lang.Thread. It thus uses the unit of execution (i.e. the thread) as the means of indicating ownership for the resource.

The resource manager (the dispatcher 124) then simply waits for the only application thread 233 to finish execution before reclaiming control of the device. This is achieved using language constructs in an entirely reliable way by the use of the join method on the thread 233 which is currently the owner of the resource. If the owning thread 233 exit normally or abnormally for whatever reason, fundamental language synchronisation mechanisms allow the resource manager to determine that ownership has been relinquished at step 234, enabling control to be passed 235 to the would be owner to proceed as a new owning thread 236.

This arrangement effectively replaces a "release resource" primitive by a language event that provides a fail safe solution to resource management. Such an implication is simple to implement and is more robust than the use of a "release resource" primitive. In particular, it is more robust as telephony applications requesting use of a telephony resource (such as a modem device 30) are relatively complex and potentially prone to failure. Also, such applications may be provided by third party vendors whereby limited control over the quality of those applications is possible.

Figure 14:
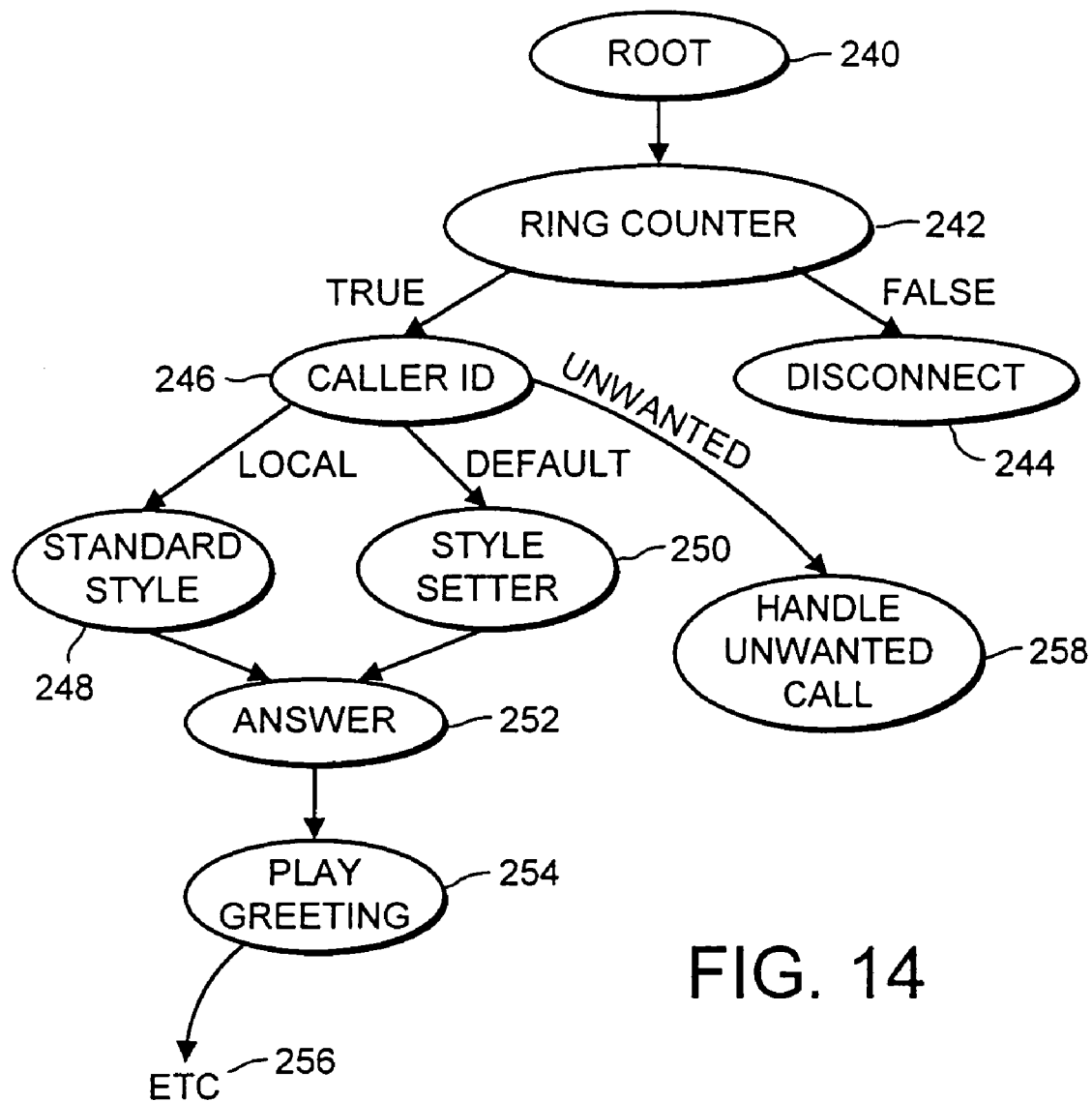
FIG. 14 is a schematic representation of part of a voice-mail application.

FIG. 14 is a schematic illustration of part of one instance of a voicemail application which could form an example of a voice application 126. The voicemail application is implemented as a directed graph where each of the nodes in the graph corresponds to a telephony component that performs a low level function of the voicemail system. Such a low level component may be performing the functions of a ring counter, detecting a caller ID, performing call filtering, answering a telephone call, playing an audio prompt, reading DTMF signalling information, reading out a user's messages, changing a voice prompt style, etc. Arcs, or links, between the nodes are used to traverse from a given node to the next node in the graph depending on the results of the operation in the given node.

The nodes are implemented by modules, preferably by objects, for performing the operation at that node.

For example, in the illustrative example of FIG. 14, a root node 240 provides access to a ring counter module 242. The ring counter module determines whether a predetermined number of rings are received (say 2, 3 or 4). If the result returned by the module 242 is "false" (for example the caller hung up after the first ring) the false arc is followed to a disconnect module 244 which performs the operations necessary to disconnect the telephone call. If, however, the ring counter module returned a true value (for example at least two rings were received), a "true" arc leads to a caller ID module 246 which looks to identify caller ID information supplied from the public switch telephone network. If the caller ID identifies that the call is local (for example corresponding to the country code in which the telecommunications device 10 is located) control passes via the local arc to a standard style module 248 which sets up a standard style for voicemail messages. For example, if the telecommunications device 10 is being used in France, the receipt of a French caller ID would cause a French language style to be selected for answerphone functions. Alternatively, if the caller ID was an international ID outside France, a default arc would be followed to a style setter module 250 which could, for example, set up an English language style for the answerphone functions. From either of the module 248 or the module 250, a respective arc could be followed to an answer module 252 which then answers the telephone call. Once the call is accepted (answered) control can pass via the following arc to a play greeting module 254 which can play the greeting in the chosen style (French or English) to the caller. The process can continue as represented at 256 to various more complex voicemail functions (not shown).

FIG. 14 also shows a further arc from the caller ID module 246. This arc could be in response to identification of a call from one of a set of numbers (e.g. for telesales companies) which causes a specific message to be played or the call to be terminated, as represented schematically by the module "handle unwanted call" 258. The caller ID module can maintain, or reference, a table of such unwanted numbers. The caller ID module is thus able to provide call filtering with calls from selected numbers being discarded or processed in a particular way. For example, the call can be hung up even before ringing the user's telephone sounder.

It should be noted that in FIG. 14, a directed graph structure is shown in that control can pass from various modules to a common module, and indeed control can pass back in a re-entrant manner to a previous or equivalent module (not shown).

Figure 15:
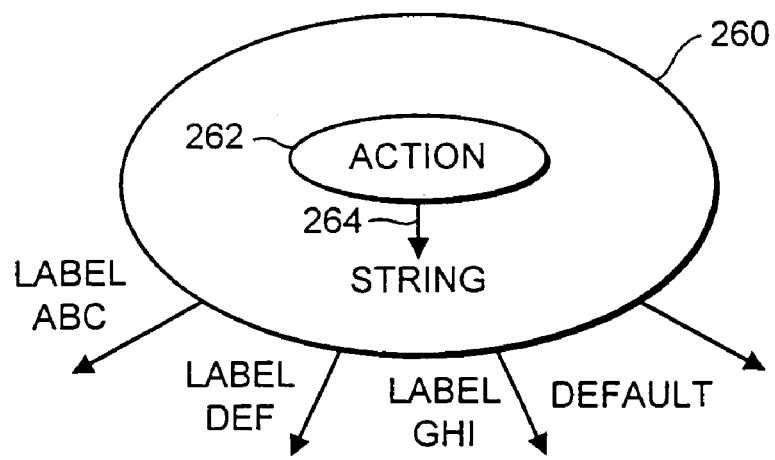
FIG. 15 is a schematic representation of an object forming a module of an application.

In the present example, the modules are implemented as objects, in particular language objects using the Java programming language. Such an object is represented schematically in FIG. 15. The object or module 260 implements an action 262 by means of a method of that object. The result returned by the method is in the form of a string 264 which identifies the link or arc to a successor object. Thus, in the example shown in FIG. 15, if the results returned are ABC, DEF, or GHI, these correspond to labels respectively for an arc labelled ABC, DEF, or GHI, respectively. If the result is other than one of the identified labels, then this is interpreted as leading to a default arc labelled as such in FIG. 15. It should be noted that although three letter representations of the labels have been used in FIG. 15, this does not indicate that the string should be three letters, this being merely used for illustrative purposes.

The use of an object based structure of this type, enables a very flexible definition of a call handling application such as a voicemail application. As telephony services become more complex, individual users make more and more widely differing demands on their voicemail systems. Some require complex voicemail systems with specific welcoming messages to be sent out at specific times, and other users require specific messages to be sent out depending on the identity or origin of the caller. Also, the use of multiple mail boxes for different members of a family, or of a business, and more complex functions can often be demanded by users. The use of a structure as described above enables an extremely flexible definition of a voicemail system.

The directed graph object is defined as a serialised object which is accessible by the operating system class loader (in the present instance a class loader found in the Java environment). Serialisation is a feature of, for example, the Java language. A bean object persists by having its properties, fields, and state information saved and restored to and from storage. The mechanism that makes persistence possible is called serialisation. When a bean instance is serialised, it is converted into a data stream and written to storage. Any applet, application, or tool that uses that bean can then "reconstitute" it by deserialisation. Seen in another way, object serialisation supports the encoding of objects, and the objects reachable from them, into a stream of bytes; and it supports the complementary reconstruction of the object graph from the stream. By defining the graph object as a serialised object, it can be created externally or internally to the telecommunications device and can be stored within the telecommunications device, and called by the class loader when required.

Figure 16:
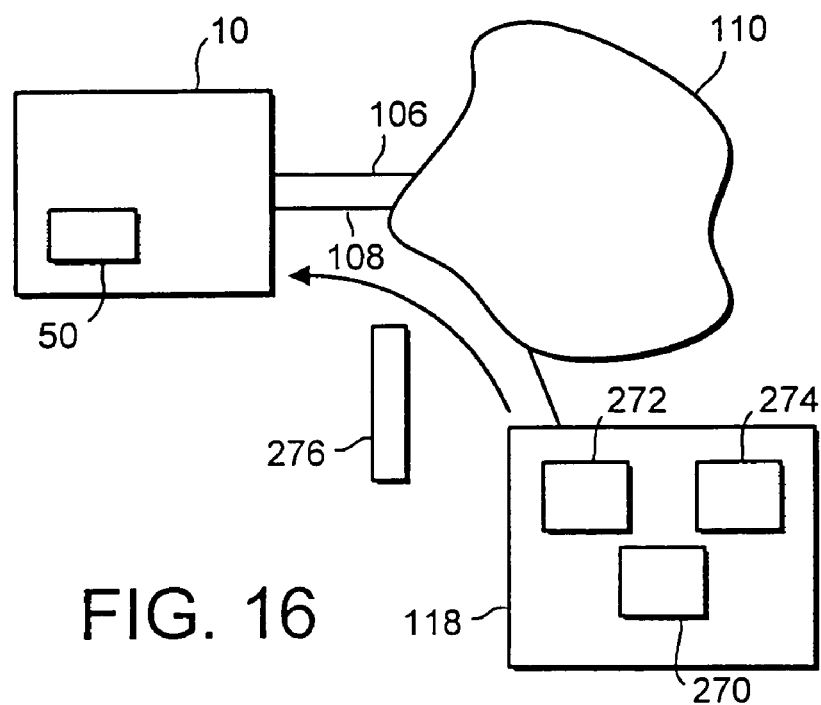
FIG. 16 is a schematic representation of the remote loading of an application.

FIG. 16 illustrates an example where a plurality of different telephony controls defining voicemail systems 270, 272, 274 are stored at a remote web server 118 and can be displayed to the user of the telecommunications device 10 using a conventional web browser. Using conventional techniques details and demonstrations of the individual telephony controls can be supplied to the user by appropriate user actions.

FIG. 16 illustrates a situation where the user has selected one of the telephony controls having a desired voicemail functionality and a copy the serialised object 276 which is identified by a root node and defines the voicemail functionality is download from a remote server 118 via the telecommunications network 110 (for example in response to a simple drag and drop operation by the user) and stored on the hard disk drive 50 within the telecommunications device 10. As the run-time behaviour of the serialised object formed from a directed graph identified by a root node is not fixed by a program, and because a class loader is used, the voicemail application is highly dynamic and may come from anywhere, in particular, from the web over the telecommunications network 110. This provides extreme flexibility to meet the varying customer requirements as described above.

The flexibility provided facilitates the development and operation of call answering functions within the telecommunications device to provide remote access to messages, e-mails and faxes received and retained by the telecommunications device.

The call handling mechanism and/or the various applications and functional modules may be provided in the form of a computer program product, that is computer software, on a carrier medium. The carrier medium can be a magnetic or optical storage device, or any other form of storage medium, or an wire, optical, wireless or satellite telecommunications transmission medium, or any other suitable carrier medium. Alternatively, or in addition, at least part of it may be embedded or hardwired in a device such as an ASIC.

It will be appreciated that although particular embodiments of the invention have been described, many modifications/additions and/or substitutions may be made within the spirit and scope of the present invention as defined in the appended claims.

What is claimed is:

1. A resource manager operable to control allocation of a resource to competing computing processes including at least a first process and a second process, the resource manager being responsive to identification of a thread for the first process requesting allocation of the resource, when the resource is already allocated to a thread for the second process, to establish a joining function to the thread for the second process and to provide an indication to the first process of an expected time before the resource will become available determined based on a call duration value of a communication associated with the second process, the first process retrying requesting of the resource at a later time based on the indication, wherein the joining function is operable to notify the resource manager on termination of the thread for the second process, and the resource manager is operable in response to termination of the thread for the second process to allocate the resource to the thread for the first process when the first process retries the request of the resource.

2. The resource manager of claim 1, wherein the resource manager comprises object oriented computer software operable in an object oriented environment.

3. The resource manager of claim 2, wherein the first and second processes are software applications operable in the object oriented environment.

4. The resource manager of claim 3, wherein the software applications comprise one or more bean objects registrable with the resource manager.

5. The resource manager of claim 1, wherein the resource manager comprises one or more objects of the Java language.

6. The resource manager of claim 1, comprising an object for acquiring a device.

7. The resource manager of claim 1, wherein the join function is a join of the type provided in a Java language environment, and a language event passively releases a resource on termination of a thread identified by the join function.

8. The resource manager of claim 1 operable to control access by a plurality of telecommunications applications to a telephony device in a telecommunications apparatus.

9. The resource manager of claim 8, comprising a dispatch mechanism for controlling dispatching of a call received by the telephony device to the telecommunications applications.

10. A resource manager operable to control allocation of a resource to competing computing processes including at least a first process and a second process, the resource manager comprising:

means responsive to identification of a thread for the first process requesting allocation of the resource, when the resource is already allocated to a thread for the second process, for establishing a joining function to the thread for the second process and for providing an indication to the first process of an expected time before the resource will become available determined based on a call duration value of a communication associated with the second process, the first process retrying requesting of the resource at a later time based on the indication; and means responsive to the joining function notifying the resource manager on termination of the thread for the second process to allocate the resource to the thread for the first process when the first process retries the request of the resource.

11. A computer software resource manager on a data carrier, the resource manager being operable to control allocation of a resource to competing computing processes including at least a first process and a second process, the resource manager being responsive to identification of a thread for the first process requesting allocation of the resource, when the resource is already allocated to a thread for the second process, to establish a joining function to the thread for the second process and to provide an indication to the first process of an expected time before the resource will become available determined based on a call duration value of a communication associated with the second process, the first process retrying requesting of the resource at a later time based on the indication, wherein the joining function is operable to notify the resource manager on termination of the thread for the second process, and the resource manager is operable in response to termination of the thread for the second process to allocate the resource to the thread for the first process when the first process retries the request of the resource.

12. A telecommunications apparatus, comprising:

at least one telephony resource for connection to a telecommunications network; and a resource manager for controlling allocation of the telephony resource to competing computing processes including at least a first process and a second process, the resource manager being responsive to identification of a thread for the first process requesting allocation of the resource, when the resource is already allocated to a thread for the second process, to establish a joining function to the thread for the second process and to provide an indication to the first process of an expected time before the resource will become available determined based on a call duration value of a communication associated with the second process, the first process retrying requesting of the resource at a later time based on the indication, wherein the joining function is operable to notify the resource manager on termination of the thread for the second process, and the resource manager is operable in response to termination of the thread for the second process to allocate the resource to the thread for the first process when the first process retries the request of the resource.

13. The telecommunications apparatus of claim 12, wherein the telephony resource is an interface to the telecommunications network.

14. The telecommunications apparatus of claim 12, wherein the telephony resource is a modem.

15. The telecommunications apparatus of claim 12, wherein the computing processes comprise call processing applications.

16. The telecommunications apparatus of claim 15, wherein the call processing applications comprise at least one application selected from:
 a call answering application;
 a voicemail application;
 a facsimile application; and
 a data application.

17. A computer-implemented method of managing allocation of a resource to competing processes including at least a first process and a second process, the method including:

responding to identification of a thread for the first process requesting allocation of the resource, when the resource is already allocated to a thread for the second process, to establish a joining function to the thread for the second process and to provide an indication to the first process of an expected time before the resource will become available determined based on a call duration value of a communication associated with the second process, the first process retrying requesting of the resource at a later time based on the indication; and responding to the joining function notifying termination of the thread for the second process to allocate the resource to the thread for the first process when the first process retries the request of the resource.

18. The method of claim 17, wherein the join function is a join function of the type provided in a Java language environment, and a language event passively releases a resource on termination of a thread identified by the join function.

19. The method of claim 17, for controlling access by a plurality of telecommunications applications to a telephony device in a telecommunications apparatus.

20. The method of claim 19, wherein the telephony device provides an interface to a telecommunications network.

21. The method of claim 20, wherein the telephony device is a modem.

* * * * *

UNITED STATES PATENT AND TRADEMARK OFFICE
CERTIFICATE OF CORRECTION

PATENT NO. : 7,036,124 B1
APPLICATION NO. : 09/259589
DATED : April 25, 2006
INVENTOR(S) : David John Martin Patterson It is certified that error appears in the above-identified patent and that said Letters Patent is hereby corrected as shown below:

In claim 1, column 13, line 49, "process when" should read --process, when--.

In claim 10, column 14, line 30, "process when" should read --process, when --.

In claim 11, column 14, line 52, "process when" should read --process, when--.

In claim 12, column 15, line 9, "process when" should read --process, when--.

In claim 17, column 16, line 13, "process when" should read --process, when--.

Signed and Sealed this

First Day of August, 2006

JON W. DUDAS
*Director of the United States Patent and Trademark Office*